Sept. 5, 1944.  A. H. SCHUTTE  2,357,694
CATALYSIS
Filed May 23, 1941   3 Sheets-Sheet 2

INVENTOR
August Henry Schutte
BY
ATTORNEY

Sept. 5, 1944.   A. H. SCHUTTE   2,357,694
CATALYSIS
Filed May 23, 1941   3 Sheets-Sheet 3
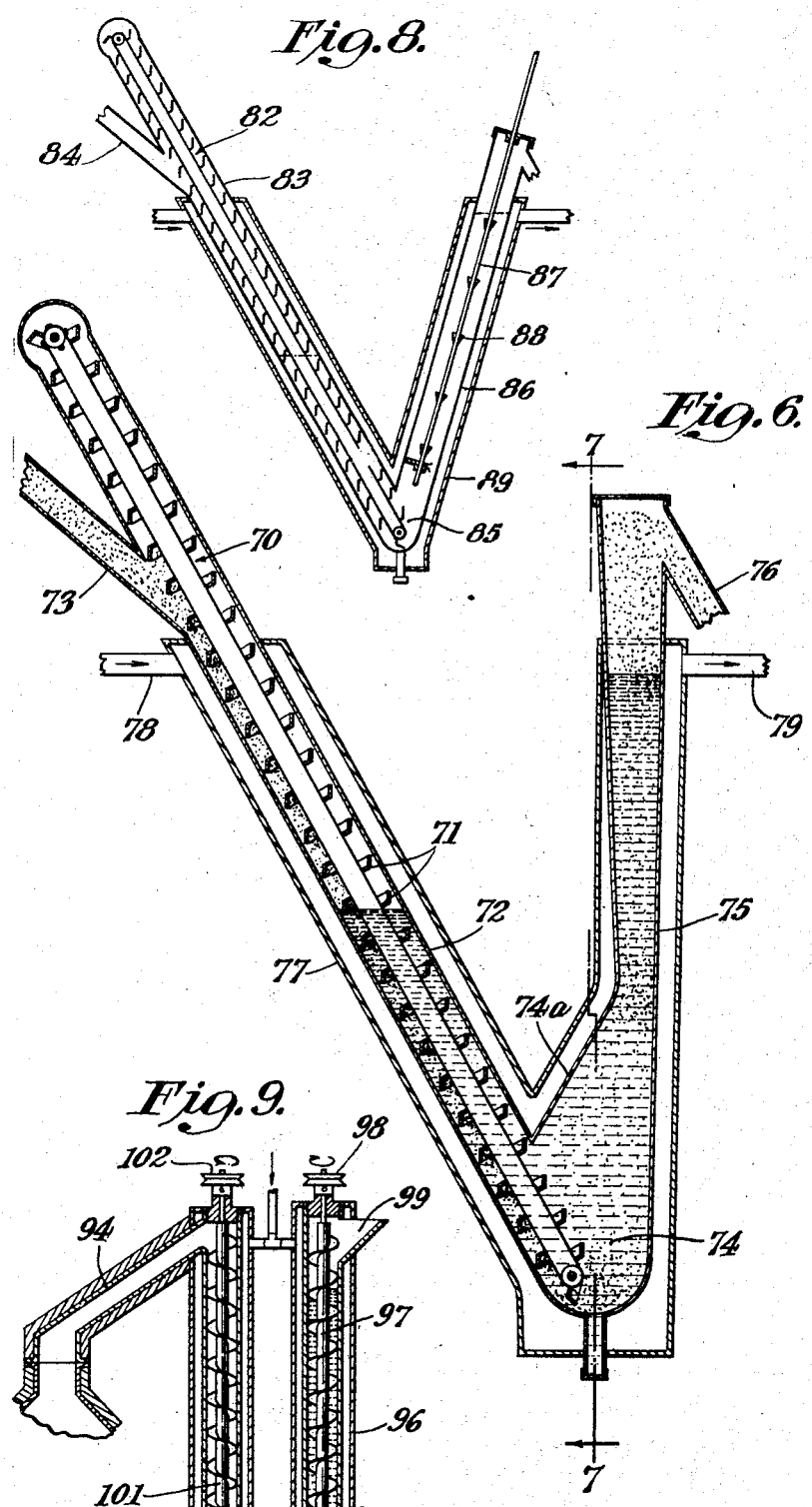
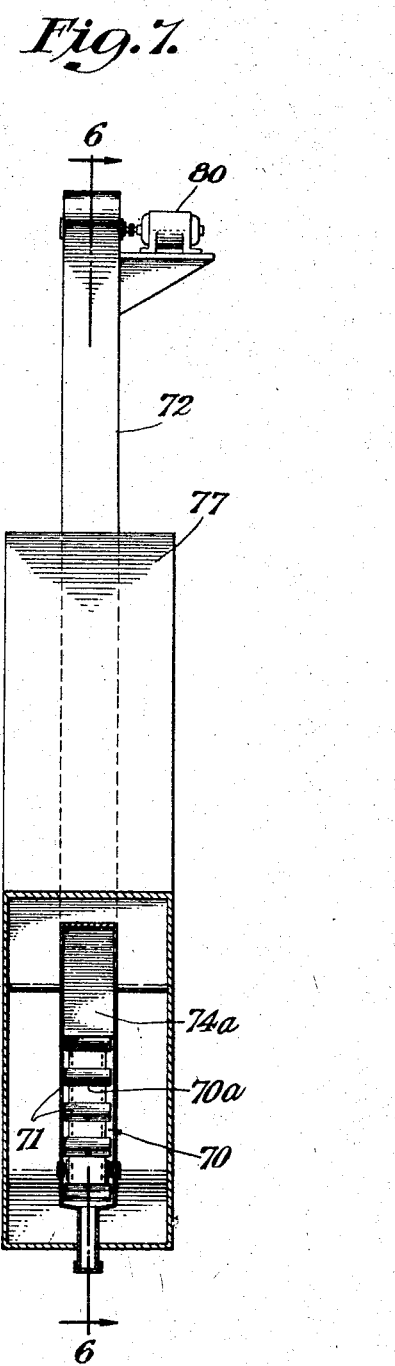
INVENTOR
August Henry Schutte
BY
ATTORNEY Patented Sept. 5, 1944

2,357,694

UNITED STATES PATENT OFFICE 2,357,694

CATALYSIS

August Henry Schutte, Tuckahoe, N. Y., assignor to The Lummus Company, New York, N. Y., a corporation of Delaware Application May 23, 1941, Serial No. 394,823

4 Claims. (Cl. 23—288)

This invention relates to the transfer of granular materials into and out of pressure-tight chambers and more particularly relates to an improved apparatus for conveying a granular catalyst in a continuous stream into and out of a chemical reaction zone without loss or contamination of the reactants. It is a continuation-in-part of the invention described in my prior application, S. N. 302,278, filed November 1, 1939. The said prior application has matured into Patent No. 2,268,535, entitled "Method of effecting catalysis."

In my previously filed application, I have referred to the well known use of catalysts whereby desired chemical reactions can be accelerated or can be carried out at lower temperatures or lower pressures or can be accomplished in a more selective manner. The invention described therein is concerned with a method of carrying out a catalytic reaction in which both the catalyst and the reacting materials continuously flow in countercurrent relation through a reaction chamber with a continuous introduction of fresh catalyst into the reaction chamber and a continuous removal of partially contaminated or fouled catalyst therefrom. In this way the highest efficiency of reaction is obtained as the reacting products passing to the outlet come in contact with the freshest catalyst entering the chamber.

Inasmuch as catalytic reactions, particularly in the hydrocarbon field, are carried out at pressures other than atmospheric and inasmuch as loss of the reactants must be avoided and contamination thereof must be prevented to obtain optimum operation, it is necessary to maintain a suitable continuous seal in continuous catalysts to prevent the flow of reactants out of the reaction zone or the flow of the external atmosphere into the reaction zone. This object is accomplished in accordance with my invention by passing the catalyst through an inert, non-wetting liquid seal at both the point of catalyst introduction to and the point of catalyst discharge from the catalyst chamber. There is thus provided a seal which is not destroyed by the continuous movement of granular catalyst therethrough.

One of the principal objects of my present invention is to provide a gas-tight seal for a chamber whereby the uniform and continuous passage of granular material through the seal may be accomplished by means of a conveyor and whereby different pressure conditions may exist at the respective ends of the conveyor, which pressure conditions will not be influenced by movement of the material.

Another object of my invention is to provide an improved conveying apparatus for a catalyst reaction chamber whereby catalyst may be continuously fed to and discharged from the chamber without loss of reactants.

More particularly, my present invention has the advantage of utilizing commercial conveyors modified only to cooperate with a non-wetting liquid seal so that a granular catalytic material may be carried into and out of a reaction zone without allowing egress of vapors or contaminating the catalyst.

Further objects and advantages of my invention will be apparent from the following description of preferred forms of embodiment thereof taken in connection with the attached drawings, illustrative thereof, and in which:

Fig. 6 is a vertical, substantially central section of a modified form of conveyor taken along the line 6—6 of Fig. 7;

Fig. 7 is a transverse vertical section taken substantially along the line 7—7 of Fig. 6;

Fig. 8 is a substantially vertical section of a still further modified form of construction; and Fig. 9 is a vertical section of another form of conveyor.

Figure 1:
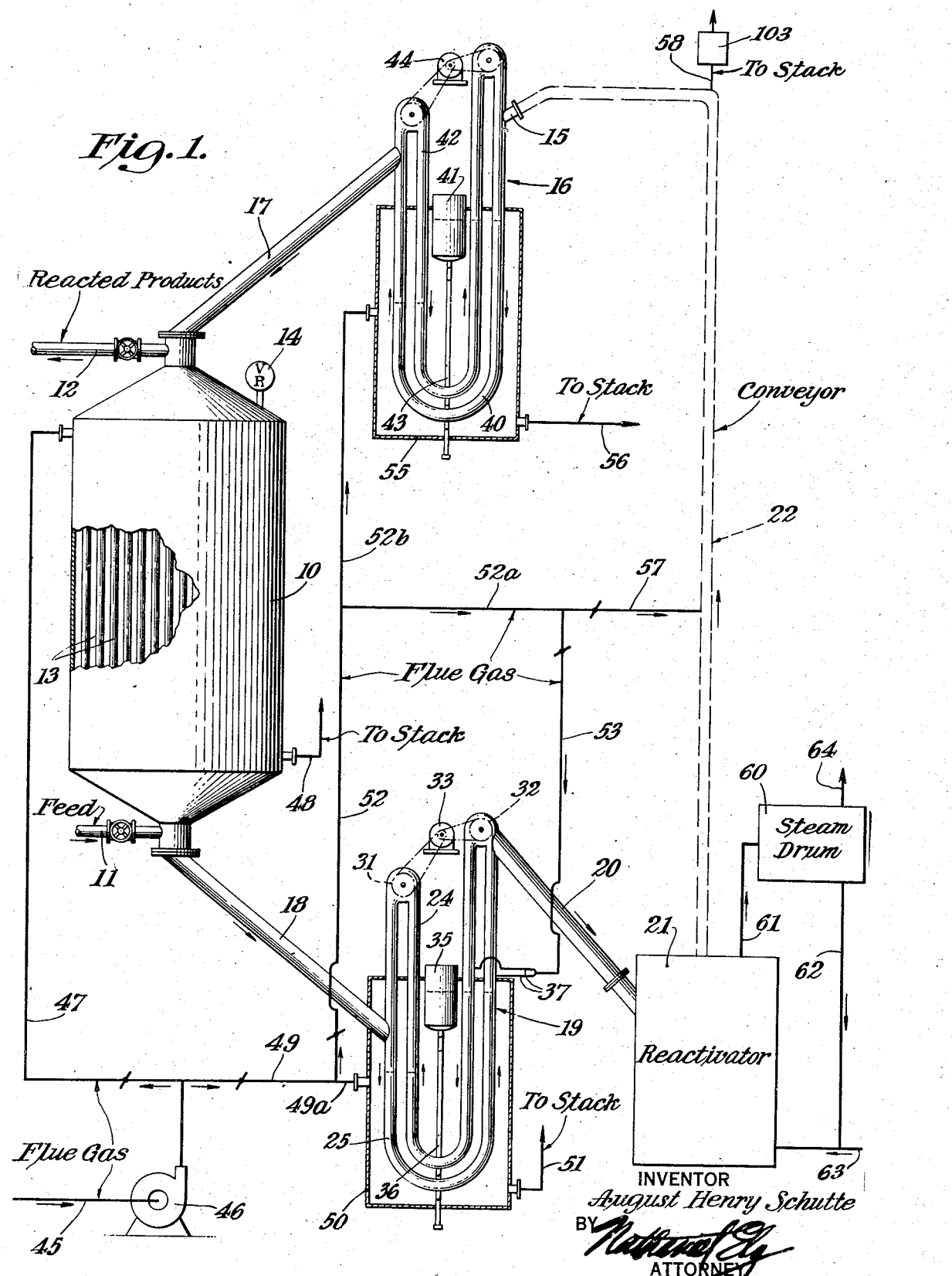
Fig. 1 is a composite elevation and flow diagram showing one arrangement of the apparatus.

In accordance with the preferred form of embodiment of my invention, the catalyst chamber 10 is one in which a catalytic reaction is carried out in the presence of a continuously moving catalyst body. The reactants may be conveniently fed into the chamber through the feed conduit 11 wherein they come into contact with the continuously moving catalyst body. The reacted products may then be conveniently removed through outlet pipe 12. For purposes of example only, these reactants may be considered to be hydrocarbon vapors undergoing conversion in the presence of a suitable catalyst, which may comprise either a solid catalytic material such as natural or synthetic blends containing silica and alumina or a solid impregnated with a catalytic material such as phosphoric acid, at a temperature in the range of 750° F. or higher. The specific temperature and the nature of the catalyst are not features of my invention but will be well known for a particular conversion to those skilled in this art. Pressure operation is usual and relief valve 14 is thus customarily used.

The catalyst, in accordance with my invention, substantially fills the tubes 13 through which the reactants pass and is preferably granular and has a size such that there is only sufficient free space between the particles thereof to permit flow of the reactants through the chamber with a reasonably low pressure drop. The size of the catalyst particles is usually relatively large, e. g., in the range of 0.01" to 0.5", so that they may be readily introduced to and removed from the catalyst chamber but is also small enough so that adequate surface area for contact is provided.

The principal feature of my invention is to continuously pass the catalyst into the chamber 10 and to remove it therefrom without loss of reactants or any substantial contamination of the atmosphere within the chamber. The rates of feed to and of withdrawal from the chamber are readily adjusted so that the quantity of catalytic material within the chamber 10 may be maintained practically constant. In this manner fresh catalyst is continuously fed into the chamber, and spent catalyst is continuously withdrawn therefrom and uniform high yields of reaction products are accomplished. Each of the conveying operations is independently carried out by means of an enclosed conveyor which is provided with a non-wetting liquid seal, through which the catalyst is passed and by which the vapors are effectively confined in the respective chambers.

At the commencement of operations, fresh catalyst is initially introduced through the inlet nozzle 15 into the catalyst conveyor, generally indicated at 16, which in turn discharges the catalyst through the conduit 17 into the upper part of chamber 10. After passing through the chamber 10 and having become fouled and contaminated, the catalyst is then removed from the bottom of the chamber through the discharge conduit 18 into the catalyst discharge conveyor, generally indicated at 19. The catalyst is discharged through the outlet 20, from which it may pass to a reactivating chamber 21 for the desired reactivation. The reactivated catalyst may then be carried by the conveyor 22 for return to the initial catalyst feed nozzle 15 in a complete cycle.

Inasmuch as the catalyst feed conveyor 16 is substantially the same as the catalyst discharge conveyor 19, I refer to the latter as shown in Figs. 2 to 5 inclusive as one form of apparatus by means of which the vapor seal is accomplished without interruption of the continuous flow of the granular material.

The discharge conveyor 19 consists primarily of two interconnected U-tubes 24 and 25 which are each preferably cylindrical although they may be of other shape and which comprise a continuous closed path through which a link conveyor 26 is carried. This may be a standard commercial form of device and may consist essentially of a series of articulated links more specifically shown in Fig. 4. Preferably the individual links 27 are articulated in any known manner and may pass in a continuous path through the respective U-tubes.

Figure 5:
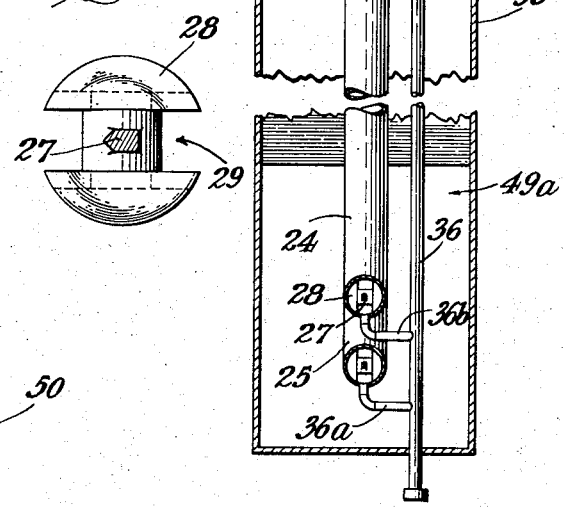
Fig. 5 is a horizontal cross section taken substantially along the line 5—5 of Fig. 4.

The links 27 have flights 28 of the same sectional shape as the U-tubes; and, as shown in Fig. 5, the flights may have internal openings 29 so that they may carry solid matter through a liquid with the liquid falling back as will be hereinafter described. Pulleys 31 and 32, operated by a motor 33, serve to transmit a driving force to the conveyor.

In operation, as the granular catalyst discharges from the catalyst chamber 10 through the discharge conduit 18 into the outer U-tube 25 of the discharge conveyor 19, it is picked up by the conveyor member 26 which continuously moves past the end of the discharge conduit 18. The conveyor flights 28 engage the catalyst and carry it around the bottom of the U-tube 25 to the discharge outlet 20.

To make these ends of the conveyor path gastight with respect to each other, I fill the U-tube 25 with a liquid material that may be introduced through surge tank or reservoir 35, which is interconnected with the U-tube by pipes 36 and 36a. The liquid will substantially fill the U-tube 25 and will, by virtue of the pressure difference, seek its own level therein although the surge tank will reduce the effect of sudden pressure changes which might flow liquid into a discharge outlet. The movement of the conveyor does not materially disturb the level of the liquid.

The liquid used to effect the seal should have certain characteristics and should be selected with regard to the particular operating conditions and the particular reaction. It should have a melting point sufficiently below and a boiling point sufficiently above the reaction temperatures so that slight temperature variations within the catalyst chamber will not alter its physical state. It is desirable to use a liquid having a high specific gravity such that the necessary liquid head to balance the differential pressure can be maintained within a reasonable height. The specific gravity of the liquid should preferably be greater than that of the catalyst so that the catalyst does not accumulate at the low point of the seal. The liquid should not wet or adhere to the catalyst particles in any way, and it should not react chemically with the catalyst; otherwise, the catalytic reaction may not be satisfactorily carried out, or the activity of the catalyst may be adversely affected. It is also preferable that gases dissolve in the liquid to a negligible extent.

The liquid seal may be made in any desired shape but is preferably in the form of balanced columns as in a U-tube. These columns should have such a length that the available liquid head therein is sufficiently greater than the pressure differential between the catalyst chamber and the external atmosphere to prevent breaking of the liquid seal by pressure surges. With a U-tube it is especially convenient to use standard conveyors as the catalyst propelling means.

Certain metals have been found especially suitable as the liquid sealing agent since most catalytic reactions must be carried out at elevated temperatures. Metals having a high specific gravity and a relatively low melting point such as lead, are especially useful when the reaction requires a pressure substantially in excess of atmospheric. Molten lead is also found most satisfactory for use with bauxite and similar clay-like catalysts often used in petroleum hydrocarbon reactions. Its specific gravity is such that excessive heights of liquid are not required to withstand operating pressures below about 100 pounds per square inch gauge. Furthermore, it does not wet the catalyst used; it does not react chemically with the catalyst; and it does not materially vaporize at reaction temperatures in the range of 800–1,000° F. Under such conditions, the catalytic dehydrogenation, desulfurization, conversion, or the like of petroleum hydrocarbons may be successfully carried out. Normally liquid materials such as mercury, other molten metals or molten alloys, and the like may also be used.

The liquid seal is also maintained in the inner U-tube 24 by interconnecting the reservoir 35 as through pipes 36 and 36b. It is necessary to have both U-tubes sealed to prevent blow through of gases or vapors from the discharge conduit 18 to the discharge outlet 20. Preferably the open portions of the U-tubes are maintained full of hot gases and vapors. This object may be accomplished in the section into which the catalyst is discharged from chamber 10 by leakage of reactants from the catalyst chamber. In the section from which the catalyst is discharged for reactivation, flue gas may be introduced as by means of pipes 37; this gas will escape through the outlet 20 into the reactivation chamber 21.

With reference again to Fig. 1, catalyst is continuously introduced into the chamber 10 by means of a similar continuous conveyor 16 including the U-tube 40, which is provided with the catalyst inlet 15 and through which the catalyst is carried to the top of the conduit 17. In a similar manner a reservoir 41 is provided for the non-wetting liquid sealing material, which is similarly introduced to the outer catalyst conveyor tube 40 and the inner U-tube 42 through conduit 43. The conveyor is similarly operated as by motor 44. As before mentioned, by regulation of the speed of the respective motors 33 and 44, it is possible to obtain uniformity of flow of material through the catalyst chamber 10.

Uniform temperature of operation may be accomplished by the circulation of a heating medium in any suitable manner by the introduction of hot flue gases through the line 45 to the blower 46 and the passage of the gases under pressure through the line 47 to the catalyst chamber 10. The gases may be withdrawn through the line 48 to the stack (not shown). Another portion of the heating medium may be introduced through lines 49 and 49a to the heating jacket 50 surrounding the conveyor 19; the gases may be discharged to the stack as at 51. Another portion of the heating medium may be introduced through lines 49, 52, 52a and 53 directly into the top of the discharge conveyor 19 by means of the interconnecting lines 37. Still another portion may be introduced by lines 49, 52 and 52b into the jacket 55 surrounding the feed conveyor 16, from which the gases may be removed to the stack through the line 56. An additional portion may be introduced through lines 49, 52, 52a and 57 to the conveyor 22. Line 58 discharges flue gas from conveyor 22 to the stack. By introducing flue gas into the discharge end 20 of conveyor 19 and into conveyor 22, I am able to maintain a substantially inert atmosphere therein so that oxidation of the lead by contact of the gases with the lead surfaces in both the feed and the discharge conveyors is prevented.

The heating medium for most of this apparatus is preferably flue gas although it will be appreciated that, where it is merely circulated around a conduit such as in the catalyst chamber 10 or in the jacket 55 for the feed conveyor 16 or in the jacket 50 surrounding the discharge conveyor 19, any other heat source such as molten salt may also be used.

The temperature of reactivation in chamber 21 is such that it is desirable to take advantage of the heat as for the formation of steam. A steam drum 60 is suitably connected as by a steam header 61 and a downcomer or water connection 62 with coils (not shown) in the reactivation chamber 21. Make-up water is supplied through the line 63, and steam is removed through the line 64.

Figure 2:
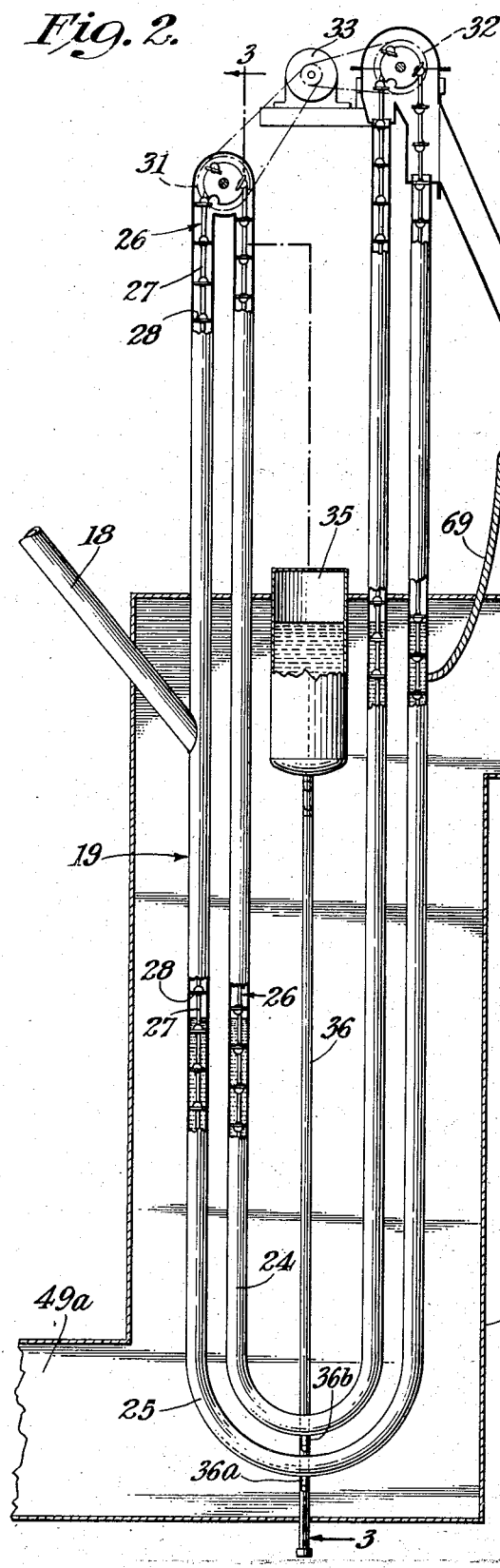
Fig. 2 is a partal elevation with certain parts in section on a somewhat larger scale of one of the conveyors shown in Fig. 1.
Figure 4:
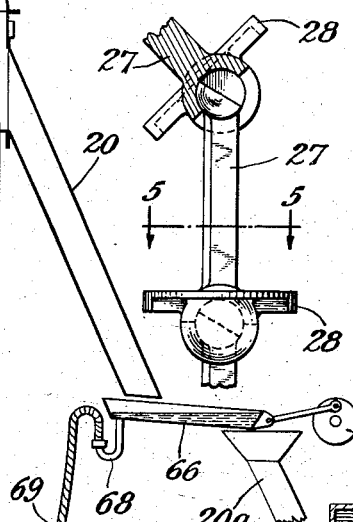
Fig. 4 is an enlarged detail, with parts in section, of some of the flights of the conveyor.
Figure 3:
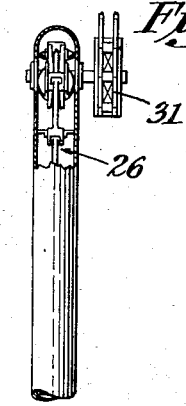
Fig. 3 is a transverse vertical section taken substantially along the line 3—3 of Fig. 2.

It may be found desirable, if any objectionable amount of the liquid forming the seal is carried out on the catalyst, to use a vibrating trough or similar device which will slightly agitate the catalyst and cause a coalescence of the liquid. A form of device which may be found useful for such purpose is also shown in Fig. 2. Preferably, it is a relatively shallow and wide tray 66 which intercepts the catalyst as discharged from conveyor 19 through outlet 20. The tray may be moved in an oscillatory manner by any suitable means such as an eccentric 67; the liquid thus released may be carried by means of trapped pipe 68 to the line 69 and thence to the liquid seal in the outer U-tube 25. The catalyst will, of course, be carried away from the tray through conduit 20a for discharge to waste or to the reactivation chamber 21 as heretofore described.

A modified form of conveyor is shown in Figs. 6 and 7, which device also has a U-tube configuration so that a liquid seal can be used. In this construction the conveyor 70 is continuous and has buckets 71 moving in a suitable housing 72, the upper part of which is interconnected with the discharge conduit 73. The conveyor buckets engage the catalyst particles and carry them downwardly to the well portion 74, which is submerged in the liquid seal. Holes 70a allow the liquid to fall back.

The well portion 74 is preferably enlarged at 74a so that the catalyst will free itself from the conveyor buckets. Because of the difference in the specific gravity of the catalyst, which is relatively light, and that of the sealing liquid, which is usually very heavy, the catalyst will rise vertically into the discharge leg 75, from which the catalyst may be removed through the outlet 76. A casing 77 is used to maintain the desired temperature by passage of a suitable heating medium thereinto at 78 and removal therefrom at 79. The conveyor is driven as by motor 80. Preferably discharge leg 75 is outwardly flared as shown in order to prevent any arching of the catalyst, with consequent plugging of the leg, as the catalyst rises through the liquid.

A still further modified form of construction is shown in Fig. 8, in which the conveyor 82 is mounted in a housing 83 and is adapted to transfer a granular material from a conduit 84 interconnected therewith to the well 85, from which the granular material will pass upward through the leg 86 under the difference of density between the granular material and the liquid constituting the seal.

In this case, a rod 87 having serrations, teeth, or projections 88 may be provided, which rod is reciprocated by any suitable means (not shown) to prevent any of the granular mass from arching in leg 86. A jacket 89 may be used to maintain the temperature.

A still further modified form of construction is shown in Fig. 9, in which a screw form of conveyor is used. In this case, the feed conveyor is shown as distinguished from the discharge conveyors shown in the prior forms of embodiment of the invention. It also consists of a substantially U-shaped sealing device 93 which may be considered to be an extension of the feed conduit 94. It is also adapted to hold a liquid, indicated at 95, for the seal. If desired, the conveyor may also have a jacket 96, to which a heating medium may be supplied.

The propelling means in this type of construction is shown as a screw conveyor 97, which may be driven as by a pulley 98 from any suitable source of power (not shown). The catalyst, which is fed into the conveyor at 99, is carried downwardly through the liquid seal by the screw 97 into the lower portion of U-tube 93. Because of the difference in the specific gravities of the catalyst and the sealing liquid, the catalyst will rise to the top of the other leg of the U-tube. Preferably, the screw 101 operated by the pulley 102 is provided to aid the catalyst in its upward passage through this leg. The catalyst then falls through the feed conduit 94 into the catalyst chamber.

The use of conveyors of the foregoing types will normally effect a movement of the granular catalyst without objectionable attrition or the formation of powder or dust so that the catalyst may be repeatedly carried through the entire cycle of reaction and revivification, it being understood that provision will be made to add some make-up catalyst and withdraw used catalyst as may be found necessary. If dust or powder is formed in the movement of the catalyst, the use of the conveyor elements shown in Figs. 4 and 5 in the conveyor 22 with the introduction of the flue gas from line 57 as shown in Fig. 1, will assure the complete carrying away of the dust particles from the larger granular catalyst, and if desired, the dust may be removed by a suitable dust collector 103 or allowed to blow into the atmosphere depending upon its quantity. This assures the use of dust-free catalyst in the reaction chamber 10 and thus dust-free reaction products removed in line 12.

It will be appreciated that passage of the catalyst through the molten metal seal may also be used to advantage to preheat the catalyst. Temperature conditions throughout the apparatus may thus be maintained substantially constant. It will also be appreciated that the reaction chamber may be operated under a vacuum as well as a superatmospheric pressure; in such case the depths of liquid in the respective legs of the U-shaped vessels are changed so that the greater depth of liquid is in the leg attached to the chamber.

Although I have described preferred forms of embodiment of my invention, I am aware that other modifications may be made thereto; and I, therefore, desire a broad interpretation of my invention within the scope and spirit of the description herein and of the claims appended hereinafter.

I claim:

1. In combination with a catalyst chamber maintained at other than atmospheric pressure, conduits for respectively introducing reactants thereto and withdrawing reacted products therefrom, an inlet conduit for introducing catalyst thereto, an outlet conduit for removing catalyst therefrom, means to seal said inlet and outlet catalyst conduits against vapor leakage comprising columns of a molten metal having heads sufficient to balance the differential pressure between the chamber and the external atmosphere, said molten metal being non-wetting and chemically inert towards the catalyst, means to maintain said metal in molten condition, and means to introduce into said conduits above the molten metal surface an inert gaseous medium to prevent oxidation of the metal.

2. In combination with a catalyst chamber in a reaction zone maintained at a pressure other than that of a zone external thereto, a gas-tight catalyst conduit connecting said zones, a charge of molten metal within said conduit, the conduit being constructed and arranged and the volume of said liquid charge being correlated therewith to form a head of the metal sufficient to balance the difference in pressure between said zones and maintain a liquid seal therebetween, means to pass a solid granular catalyst through said conduit and through said liquid seal for delivery of the catalyst from one of said zones to the other, said molten metal being non-wetting with respect to the catalyst, means to maintain said metal in a molten condition, and means to introduce into said conduit, above the surface of the molten metal, an inert gaseous medium to prevent oxidation of the metal.

3. In combination with a catalyst chamber in a reaction zone maintained at a pressure other than that at a zone external thereto, a gas-tight catalyst conduit connecting said zones and constructed and arranged to form a U-shaped well, a liquid within said well in a volume sufficient to charge same to a level above the level of the bend of the U and provide a head sufficient to balance the difference in pressure between said zones and maintain a liquid seal therebetween, an endless chain conveyor to continuously pass a solid granular catalyst through said conduit and through said liquid seal for delivery of said catalyst from one of said zones to the other, said liquid being non-wetting with respect to the catalyst, pulleys located at the upper ends of the respective legs of the U formed by said conduit and training said conveyor to form thereof a catalyst-advancing reach extending through said conduit and an external return reach, a gas-tight conduit enclosing said return reach between said pulleys and constructed and arranged to form a U within said U-form of the first conduit, a gas-tight housing for one of said pulleys, said housing interconnecting the upper end of a leg of the second U and the adjacent upper end of the leg of the first conduit which is in communication with the reaction zone, and a charge of liquid in said second conduit to seal the latter against passage of gas therethrough.

4. In a system for conducting a contact process and including means defining a contact zone wherein fluid is brought into contact with a solid contact material in a divided state, apparatus for transferring such contact material between said zone and a zone external thereto and preventing exchange of gas between the zones, comprising a U-shaped gas-tight conduit for said material, a gas-tight delivery connection between one of said zones and said conduit to pass the contact material to one of the legs of the latter at a point spaced above the U-bend, the other leg of the conduit having, at a point spaced above the U-bend, an exit for passage of the material into the other of said zones, a body of liquid within said conduit between said points of admission and egress of the contact material, said liquid being non-wetting and non-reactive with respect to said material, an endless conveyor extending through said conduit and said seal for passage of said material between said points, a U-shaped gas-tight conduit enclosing a return reach of said conveyor and having its legs arranged opposite the legs of the first conduit respectively, gas-tight conduit interconnections between the upper ends of adjacent legs of said conduits and forming with said U-shaped conduits an endless conduit for said conveyor, means within said interconnections training the conveyor for passage thereof between the U-shaped conduits, one of said training means comprising a pulley for driving the conveyor, and a body of liquid within the lower portion of said second conduit, said bodies of liquid forming seals to prevent exchange of gas between said zones.

AUGUST HENRY SCHUTTE.